US010567552B2

(12) United States Patent
Allen et al.

(10) Patent No.: US 10,567,552 B2
(45) Date of Patent: *Feb. 18, 2020

(54) EXPANDING AN ANSWER KEY TO VERIFY A QUESTION AND ANSWER SYSTEM (71) Applicant: International Business Machines Corporation, Armonk, NY (US)

(72) Inventors: Corville Orain Allen, Morrisville, NC (US); Ian Michael Bennett, San Jose, CA (US); Torsten Bittner, San Jose, CA (US); Kay Muller, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1114 days.

This patent is subject to a terminal disclaimer.

(21) Appl. No.: 14/332,573

(22) Filed: Jul. 16, 2014

(65) Prior Publication Data
US 2015/0170057 A1 Jun. 18, 2015

Related U.S. Application Data (63) Continuation of application No. 14/109,626, filed on Dec. 17, 2013, now Pat. No. 9,413,855.

(51) Int. Cl.
*G06F 17/00* (2019.01)
*G06F 17/20* (2006.01)
(Continued)

(52) U.S. Cl.
CPC ............... *H04L 67/42* (2013.01); *G09B 7/00* (2013.01); *G09B 7/02* (2013.01); *H04L 67/10* (2013.01);
(Continued)

(58) Field of Classification Search
CPC ....... H04L 67/42; H04L 67/125; H04L 67/10; G09B 7/02; G09B 7/00; G06F 9/4446;
(Continued)

(56) References Cited

U.S. PATENT DOCUMENTS

2010/0151433 A1 6/2010 Powers et al.
2012/0077178 A1 3/2012 Bagchi et al.
(Continued)

FOREIGN PATENT DOCUMENTS

CA 1230855 A1 12/1987
EP 2565799 A1 3/2013
(Continued)

OTHER PUBLICATIONS

Automatic Set Expansion for List Question Answering Richard C.Wang, Nico Schlaefer,WilliamW. Cohen, and Eric Nyberg Language Technologies Institute Carnegie Mellon University 5000 Forbes Avenue Pittsburgh PA 15213-2008.*
(Continued)

*Primary Examiner* — Kakali Chaki
*Assistant Examiner* — Ababacar Seck
(74) *Attorney, Agent, or Firm* — Garg Law Firm, PLLC; Rakesh Garg; Reza Sarbakhsh (57) ABSTRACT A method for expanding an answer key to verify a question and answer system is provided in the illustrative embodiments. A definition is constructed of an extended answer type. The extended answer type represents an answer type of an unrepresented answer. The unrepresented answer is unrepresented in the answer key as a valid response to a question in a set of valid responses to the question in the answer key. The extended answer type is created in the answer key according to the definition. The extended answer type is populated such that the unrepresented answer becomes as additional valid response to the question, the
(Continued)

creating and the populating extending the answer key to form an extended answer key. The populated extended answer type in the extended answer key is used to verify that a generated answer from the Q and A system is correct.

12 Claims, 7 Drawing Sheets

(51) Int. Cl.
*H04L 29/06* (2006.01)
*H04L 29/08* (2006.01)
*G09B 7/02* (2006.01)
*G09B 7/00* (2006.01)
*G06N 5/04* (2006.01)
*G06N 5/02* (2006.01)
*G06F 9/451* (2018.01)
*G06N 20/00* (2019.01)

(52) U.S. Cl.
CPC ............ *H04L 67/125* (2013.01); *G06F 9/453* (2018.02); *G06N 5/02* (2013.01); *G06N 5/04* (2013.01); *G06N 20/00* (2019.01)

(58) Field of Classification Search
CPC ........ G06F 9/453; G06N 99/005; G06N 5/02; G06N 5/04; G06N 20/00
USPC .......................................................... 706/11
See application file for complete search history.

(56) References Cited

U.S. PATENT DOCUMENTS

| | | |
|---|---|---|
| 2012/0258435 A1 | 10/2012 | Eleanor et al. |
| 2012/0301864 A1 | 11/2012 | Bagchi et al. |
| 2013/0226846 A1 | 8/2013 | Li et al. |

FOREIGN PATENT DOCUMENTS

| | | |
|---|---|---|
| EP | 2613234 A1 | 7/2013 |
| EP | 2616591 A2 | 7/2013 |
| WO | 2001093119 A1 | 12/2001 |
| WO | 2010028801 A2 | 3/2010 |

OTHER PUBLICATIONS

Appendix P, Jan. 22, 2015.

* cited by examiner

| NUMBER RANGE | TYPE |
|---|---|
| MIN _404_ | LONG |
| MAX _406_ | LONG |
| RANGE INCLUSIVE _408_ | BOOLEAN |

```
<xml>
<answer key>
  <question    copyright="xyz"    id="123"
    text="what was the real GDP growth of Switzerland in 2012?">
    <Literal author="abc" level="perfect"  ref="Project def"> 1% </Literal>
    <regexp  author="abc" level="perfect"  ref="Project def"> 1 ?(%1per?cent) <regexp>
    <range   author="abc" level="perfect"  ref="Project def"> 0.5, 1.5, y <range>
    . . . . .
</answer key>
</xml>
```

EXPANDING AN ANSWER KEY TO VERIFY A QUESTION AND ANSWER SYSTEM

The present application is a continuation application of, and claims priority to, a U.S. Patent Application of the same title, Ser. No. 14/109,626, which was filed on Dec. 17, 2013, assigned to the same assignee, and incorporated herein by reference in its entirety.

TECHNICAL FIELD

The present invention relates generally to a method for improving a question and answer system. More particularly, the present invention relates to a method for expanding an answer key to verify a question and answer system.

BACKGROUND

A question and answer system (Q and A system) is an artificial intelligence application executing on data processing hardware. A Q and A system answers questions pertaining to a given subject-matter domain presented in natural language.

A Q and A system is an existing application that is capable of replying with natural language answers when presented with natural language questions and one or more suitable knowledge base pertaining to the subject matter domain of the question. IBM Watson is an example of a Q and A engine. (IBM and Watson are trademarks of International Business Machines Corporation in the United States and in other countries).

A Q and A system can be configured to receive inputs from various sources. For example, the Q and A system may receive as input over a network, a corpus of electronic documents or other data, data from a content creator, information from one or more content users, and other such inputs from other possible sources of input. Data storage devices store the corpus of data. The Q and A system can operate in environments of any size, including local and global, e.g., the Internet. Additionally, a Q and A system can be configured to serve as a front-end system that can make available a variety of knowledge extracted from or represented in documents, network-accessible sources and/or structured data sources. In this manner, some processes populate the Q and A system with input interfaces to receive knowledge requests and respond accordingly.

A content creator creates content in a document for use as part of a corpus of data with the Q and A system. The document may include any file, text, article, or source of data for use in the Q and A system. For example, a Q and A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain.

Content users input questions to the Q and A system that Q and A system answers using the content in the corpus of data. When a process evaluates a given section of a document for semantic content, the process can use a variety of conventions to query such document from the Q and A system.

One convention is to send the query to the Q and A system as a well-formed question. Semantic content is content based on the relation between signifiers, such as words, phrases, signs, and symbols, and what they stand for, their denotation, or connotation. In other words, semantic content is content that interprets an expression, such as by using Natural Language Processing. In one instance, the process sends well-formed questions (e.g., natural language questions) to the Q and A system. The Q and A system interprets the question and provides a response to the content user containing one or more answers to the question. In another instance, the Q and A system provides a response to users in a ranked list of answers.

The Q and A system receives an input question, parses the question to extract the major features of the question, uses the extracted features to formulate queries, and applies those queries to the corpus of data. Based on the application of the queries to the corpus of data, the Q and A system generates a set of hypotheses or candidate answers to the input question, by looking across the corpus of data for portions of the corpus of data that have some potential for containing a valuable response to the input question.

The Q and A system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Q and A system. The statistical model may then be used to summarize a level of confidence that the Q and A system has regarding the evidence that the potential response, i.e. candidate answer, is inferred by the question. This process may be repeated for each of the candidate answers until the Q and A system identifies candidate answers that surface as being significantly stronger than others and thus, generates a final answer, or ranked set of answers, for the input question.

More information about the IBM Watson® Q and A system may be obtained, for example, from the IBM Corporation website, IBM Redbooks, and the like. For example, information about the IBM Watson® Q and A system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

A method of determining the accuracy of a Q and A system includes verifying an answer provided by the Q and A system using a set of acceptable answers. The set of acceptable answers is called an answer key. If the Q and A system's answer for a question matches an answer for that question in the answer key, the Q and A system is deemed to have responded correctly, otherwise incorrectly. The proportionality of the correct versus the incorrect answers for a battery of questions in a given domain corresponds to the accuracy of the Q and A system in that domain.

Accuracy of a Q and A system in a domain can be tested using one or more answer keys. For example, an answer key in a domain may contain acceptable answers to questions pertaining to one sub-domain but not another sub-domain. Therefore, Q and A system answers pertaining to different sub-domains have to be verified using different answer keys in that domain. Accuracy in different domains is similarly tested using domain-specific one or more answer keys.

SUMMARY

The illustrative embodiments provide a method for expanding an answer key to verify a question and answer system. An embodiment constructs a definition of an extended answer type, wherein the extended answer type represents an answer type of an unrepresented answer, wherein the unrepresented answer is unrepresented in the answer key as a valid response to a question in a set of valid responses to the question in the answer key. The embodiment creates the extended answer type in the answer key according to the definition. The embodiment populates the extended answer type such that the unrepresented answer becomes as additional valid response to the question, the creating and the populating extending the answer key to form an extended answer key. The embodiment uses the populated extended answer type in the extended answer key to verify that a generated answer from the Q and A system is correct.

Another embodiment includes a computer usable storage device including computer usable code for expanding an answer key to verify a question and answer (Q and A) system. The embodiment further includes computer usable code for constructing a definition of an extended answer type, wherein the extended answer type represents an answer type of an unrepresented answer, wherein the unrepresented answer is unrepresented in the answer key as a valid response to a question in a set of valid responses to the question in the answer key. The embodiment further includes computer usable code for creating the extended answer type in the answer key according to the definition. The embodiment further includes computer usable code for populating the extended answer type such that the unrepresented answer becomes as additional valid response to the question, the creating and the populating extending the answer key to form an extended answer key. The embodiment further includes computer usable code for using the populated extended answer type in the extended answer key to verify that a generated answer from the Q and A system is correct.

Another embodiment includes a data processing system for expanding an answer key to verify a question and answer (Q and A) system. The embodiment further includes a storage device including a storage medium, wherein the storage device stores computer usable program code. The embodiment further includes a processor, wherein the processor executes the computer usable program code. The embodiment further includes computer usable code for constructing a definition of an extended answer type, wherein the extended answer type represents an answer type of an unrepresented answer, wherein the unrepresented answer is unrepresented in the answer key as a valid response to a question in a set of valid responses to the question in the answer key. The embodiment further includes computer usable code for creating the extended answer type in the answer key according to the definition. The embodiment further includes computer usable code for populating the extended answer type such that the unrepresented answer becomes as additional valid response to the question, the creating and the populating extending the answer key to form an extended answer key. The embodiment further includes computer usable code for using the populated extended answer type in the extended answer key to verify that a generated answer from the Q and A system is correct.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that verifying a Q and A system answer is limited by the contents of the answer key used. For example, the illustrative embodiments recognize that presently, an answer includes a limited set of answer options for each question expected to be asked of the Q and A system.

An answer option in a presently used answer key has an associated answer type. Presently, answer keys use a collection of answer types that are expected to represent limited forms of acceptable answers for all potential questions in a given domain or sub-domain.

Generally, the presently used answer types are divided into two categories—literal and regular expressions. A literal answer type specifies an exact and complete answer, which must match precisely with the answer from the Q and A system. For example, if an answer of the literal answer type in a given answer key is "cheese", a Q and A system answer of "Cheese" (capitalized) or "Swiss cheese" (specific) will not match the literal answer in the answer key.

A regular expression is a compact notation for describing character or string variations within a given text. A regular expression answer type allows for an answer to be varied according to the validity of a sequence of characters used in the answer. For example, if the correct answer to a question can be "Peter Parker" or "Spiderman", an answer of the regular expression type in a given answer key can be "Peter.*Parker|Parker.*Peter|Spider-man|Spiderman|Spider.*man". The regular expression wildcard character "*", for example, allows for any other character, such as a blank space, to replace the "*". This manner of expressing answer variations using regular expressions allows limited variations of stylistic forms in which a Q and A system can answer a question in an acceptable manner.

The illustrative embodiments recognize that the literal answer type and the regular expression answer type are overly restrictive in describing acceptable answers in an answer key. The illustrative embodiments recognize that an acceptable answer can take many other forms, which do not fit within the scope of the literal answer type and the regular expression answer type. Accordingly, the illustrative embodiments recognize that the present manner of validating a Q and A system answer using an answer key limited by these answer types does not provide an accurate measurement of the Q and A system's accuracy in a given domain.

The illustrative embodiments used to describe the invention generally address and solve the above-described problems and other problems related to Q and A system verification. The illustrative embodiments provide a method for expanding an answer key to verify a question and answer system.

An embodiment defines an expanded answer type, which can be used to expand the set of acceptable answers in an answer key used for verifying Q and A system answers in a domain. An embodiment further refines the expanded answer type into new answer types as needed for accommodating answer variations for specific questions.

An embodiment can define any number of new expanded answer types based on the expanded answer type. Such expanded answer types can be domain specific, question specific, language specific, region specific, skill-level specific, or specific according to other considerations in answering a question in a domain.

An embodiment defines example expanded answer types to cover answer variations. For example, without implying a limitation thereto, answer variations can include value ranges, different languages, precision according to the skill of the question-asker, temporal context of an answer such as validity periods of an answer (an answer may be valid now but not valid next month), and synonyms.

Another example of answer variations contemplated in an embodiment includes ontology equivalence for an answer. For example, an example ontology may include information on "what breathes under water." A Q and A system may answer, "Salmon." However the answer key may have "Fish" as the valid answer. One embodiment to cover answer variations can specify, for example by including metadata to "accept ontology," would make Salmon also a correct answer variation. Many other expanded answer types will become apparent from this disclosure to those of ordinary skill in the art and the same are contemplated within the scope of the illustrative embodiments.

Some expanded answer types are expressly specified, and some are computed. Accordingly, an embodiment further includes answer variations that are computed based on instruction or logic included in an expanded answer key described herein. For example, an expanded answer key of an embodiment can include acceptance, and conditional acceptance, inclusion, or exclusion instructions for considering additional data sources in computing an expanded answer type.

As another example, computable logic can trigger computation of an extended answer type to result in a valid answer variation. Such instructions or logic can be specified in the metadata of the expanded answer key, or elsewhere in the expanded answer key within the scope of the illustrative embodiments.

The illustrative embodiments are described with respect to, certain expanded answer types, answers, questions, methodologies, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
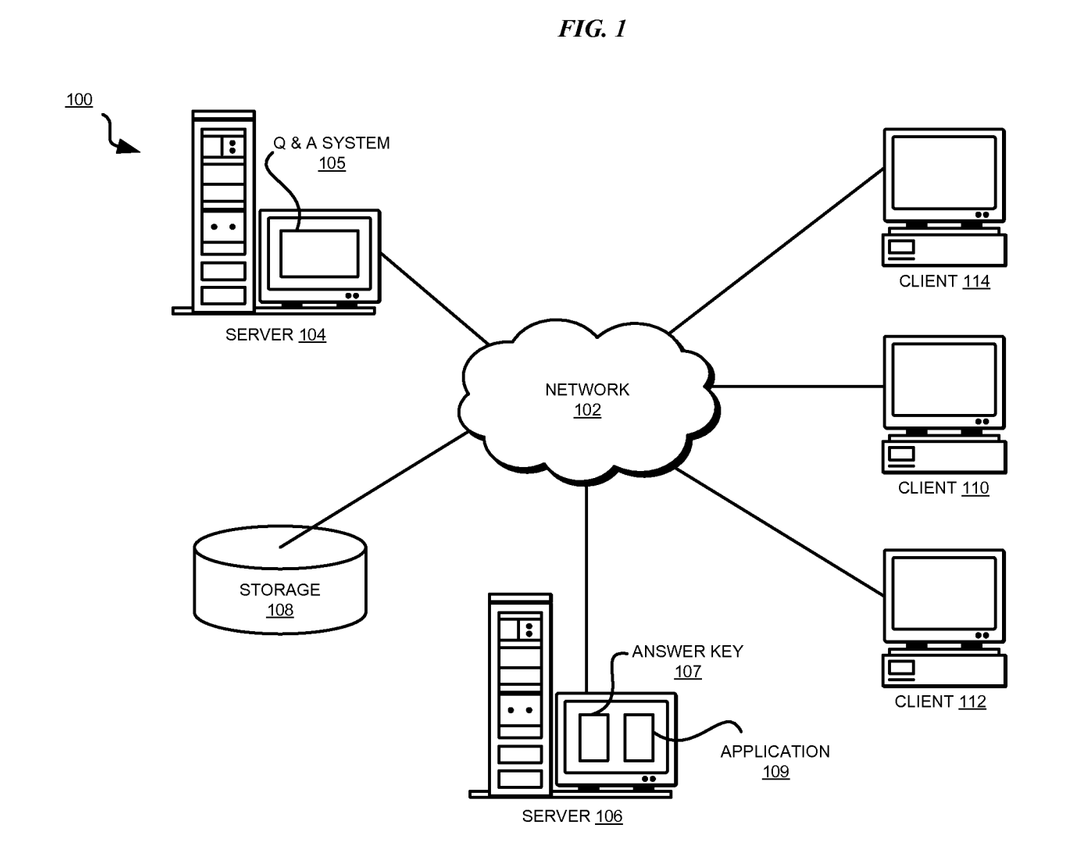
FIG. 1 depicts a block diagram of a network of data processing systems in which illustrative embodiments may be implemented.
Figure 2:
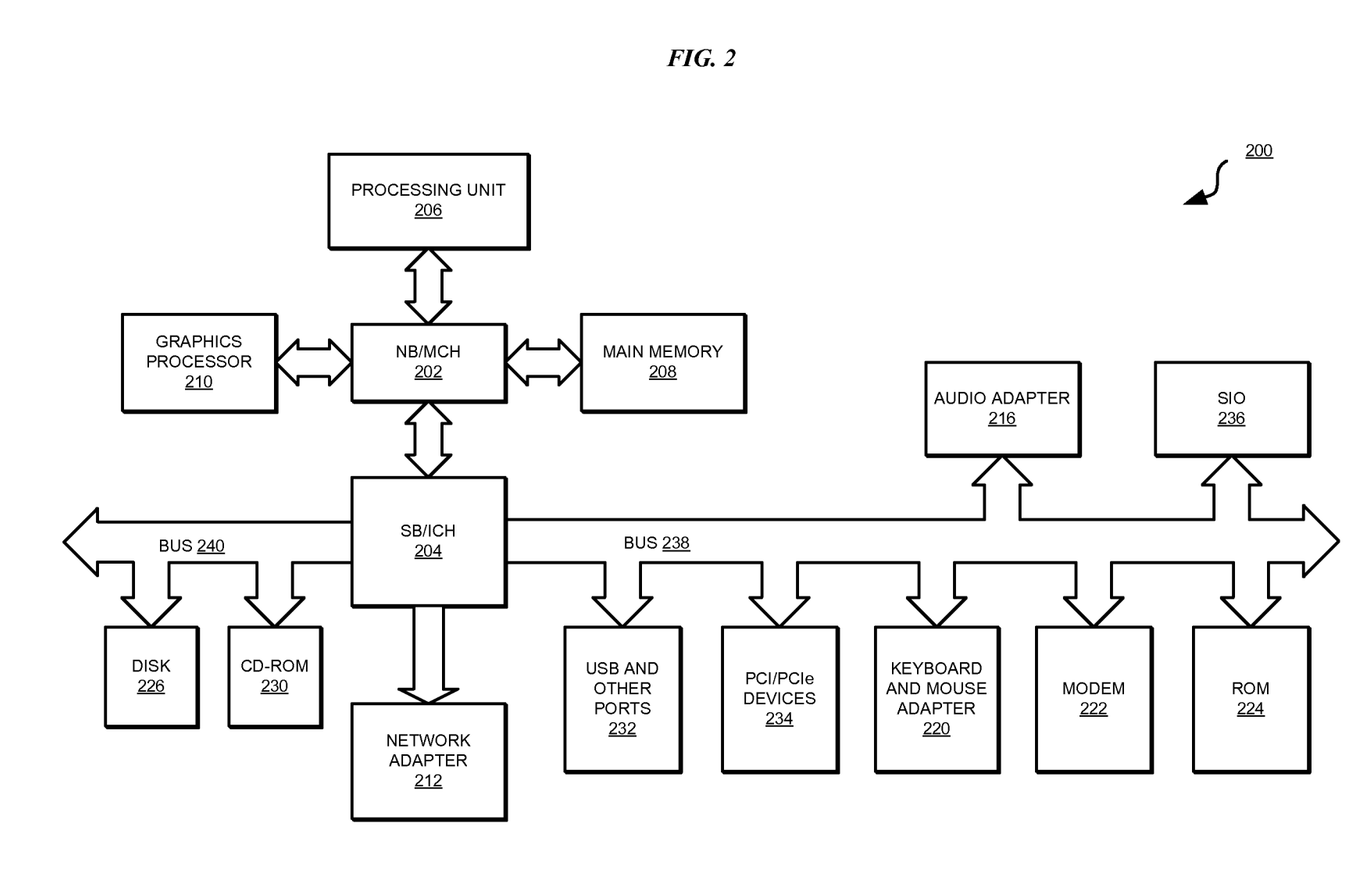
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Question and Answer (Q and A) engine 105 is an existing application that is capable of replying with natural language answers when presented with natural language questions and one or more suitable knowledgebase pertaining to the subject matter domain of the question. IBM Watson is an example of Q and A engine 109. (IBM and Watson are trademarks of International Business Machines Corporation in the United States and in other countries). Answer key 107 is an example expanded answer key according to an embodiment and used for validating answers from Q and A system 105. Application 107 implements an embodiment described herein to create expanded answer key 107.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as Q and A system 105, answer key 107, and application 109 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
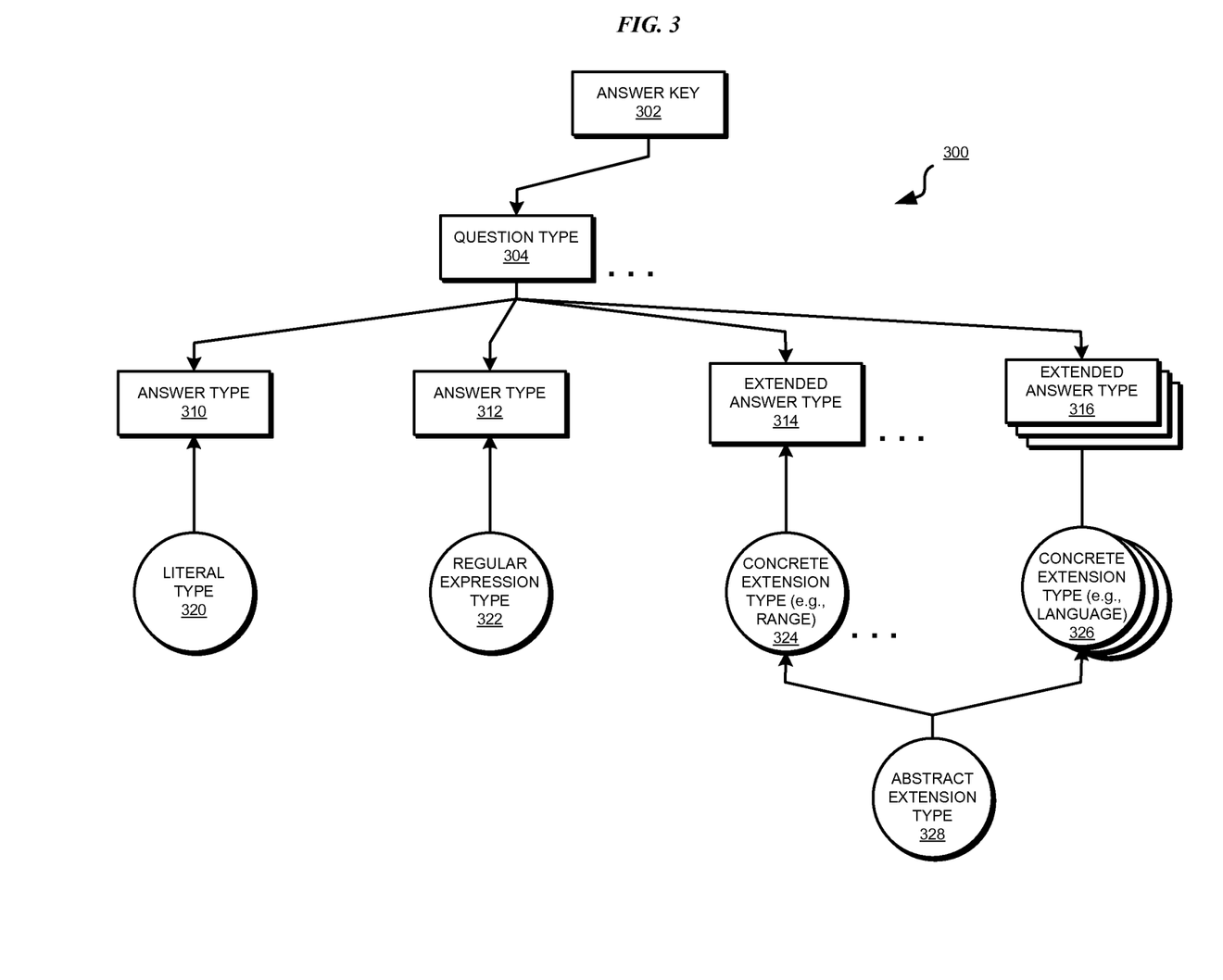
FIG. 3 depicts a block diagram of an expanded answer key usable for verifying a Q and A system with improved accuracy in accordance with an illustrative embodiment.

With reference to FIG. 3, this figure depicts a block diagram of an expanded answer key usable for verifying a Q and A system with improved accuracy in accordance with an illustrative embodiment. Answer key 300 can be implemented as answer key 107 in FIG. 1.

Answer key 300 is a machine-readable answer key document expanded according to an embodiment, and includes answer key object 302. Answer key object 302 complies with a specification for constructing machine-readable answer key 300. In one embodiment, answer key 300 is an Extensible Markup Language (XML) document and answer key object 302 complies with a given XML specification. Those of ordinary skill in the art will be able to create answer key 300 in other structured forms using this disclosure and the same are contemplated within the scope of the illustrative embodiments.

Answer key object 302 includes a set of question type objects, such as one or more of question type object 304. Question type object 304 is also specified according to the specification used for constructing answer key 300. Question type object 304 represents a question from a domain or sub-domain to which answer key 300 pertains. A question is represented in the contents of an instance of question type object 304. Different question type objects 304 are defined to represent different types of questions that can be asked in the domain.

The question in an instance of question type object 304 is deemed to have been answered correctly if the answer matches an answer in an answer type object associated with question type object 304, according to a rule applicable to an answer option in the answer type object. Answer type object 310 is formed using literal answer type definition 320, and represents a correct or acceptable literal answer to the question in question type object 304.

Similarly, answer type object 312 is formed using regular expression answer type definition 322. Answer type object 312 represents a regular expression form of a correct or acceptable answer to the question in question type object 304.

An embodiment, such as an embodiment implemented in application 109 in FIG. 1, forms extended answer type object 314 using concrete extension type definition 324. The embodiment forms one or more extended answer type object 316 using concrete extension type definition 326. Generally, an embodiment can associate any number of an extended answer type objects corresponding to a particular concrete extension type definition, with a question type object in an answer key, within the scope of the illustrative embodiments.

The embodiment forms a concrete extension type object, such as objects 324 and 326, from abstract extension type definition 328. Abstract extension type definition 328 can be partially adjusted, refined, modified, enhanced, augmented, supplemented, replaced, or otherwise manipulated, to result in concrete extension type definition 324, 326, and any number of other distinct concrete extension type definitions within the scope of the illustrative embodiments.

Abstract extension type definition 328 acts as a placeholder in answer key 300 for extending the acceptable answers to a question represented in answer key 300. For example, in one embodiment where answer key 300 is an XML document, definition 328 is represented within a question type object as <xsd:complexType name="extensionType"></xsd:complexType>

A machine reading answer key 300 is configured to read the presence of abstract extension type definition 328 as not a valid answer but a placeholder for future extended valid answers.

An embodiment modifies abstract definition 328 into concrete definition 324. Only as an example and without implying a limitation thereto, the embodiment may define concrete definition 324 to represent a range of answers. For example, a literal answer to a question may be the number 65. In reality, any answer within the range of 64-66, inclusive of 64 and 66, might be an acceptable answer to the question. Existing literal and regular expression answer types are inadequate to capture such variations in acceptable answers. Concrete extension type definition 324 allows specifying a range of valid answers to a question in answer key 300.

In one embodiment, concrete extension type definition 324 is inclusive of the range ends by default. In another embodiment, concrete extension type definition 324 is exclusive of the range ends by default. In another embodiment, concrete extension type definition 324 allows specifying whether the definition is inclusive or exclusive of the range ends.

An embodiment modifies abstract definition 328 into concrete definition 326. Only as an example and without implying a limitation thereto, the embodiment may define concrete definition 326 to represent a language of acceptable answers. For example, a literal answer to a question may be the number "one". In reality, any translation of the word "one" in another language, such as a language of choice of an audience of the Q and A system, might be an acceptable answer. Existing literal and regular expression answer types are inadequate to capture such variations in acceptable answers. Concrete extension type definition 326 allows specifying any number of language variations of valid answers to a question in answer key 300.

In one embodiment, concrete extension type definition 326 describes answer variations in a specific language by default. In another embodiment, concrete extension type definition 326 is inclusive of several language translations of an answer. In another embodiment, concrete extension type definition 324 allows specifying answer variations that are context-related variations, for example, "single" or "only" in the context of a status, "minimum" in the context of a computer programming language, and so on.

In one embodiment, a concrete extension type definition (not shown) may similarly describe answer variations in terms of temporal characteristics or dependency. For example, the literal answer to a question may be "one", but in temporal context, an acceptable answer may be "united as of 1973" or "minimum at the beginning." A concrete extension type definition allows defining such answers that are bounded in some fashion. Many other concrete extension type definitions will become apparent from this disclosure to those of ordinary skill in the art and the same are contemplated within the scope of the illustrative embodiments.

In one embodiment, a concrete extension type definition (not shown) may describe variations of answers in terms of synonyms to the answer given. A concrete extension type definition allows for defining such expansions for the answer, where all valid synonyms are acceptable.

As can be seen, many variations of acceptable answers are possible, but not represented in prior art answer keys. The existing answer types are severely limited in representing all possible variations of all possible answers to all possible questions in all possible domains, making the prior art answer key structurally insufficient to adequately measure the accuracy of a Q and A system.

In contrast, enhancing the prior art answer key with structures analogous to definition 328, 324, and 326 allows the creating of extended answer key 300, which is far more capable of representing not only the presently represented acceptable answer variations but also other acceptable answer variations. Furthermore, extended answer key 300 with structures analogous to definition 328, 324, and 326 allows creating dynamic acceptable answer variations, to represent answers as they may change with time and other factors.

Figure 4:
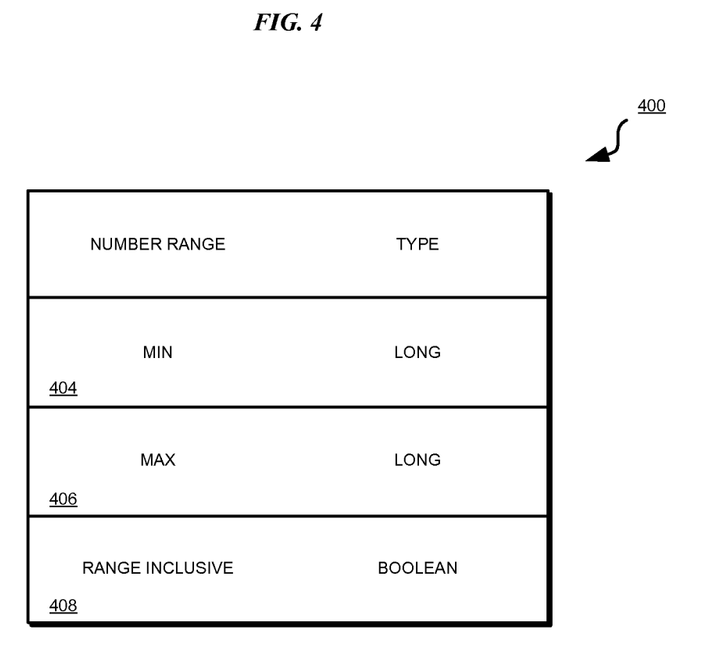
FIG. 4 depicts a block diagram of an example concrete extension type definition in accordance with an illustrative embodiment.

With reference to FIG. 4, this figure depicts a block diagram of an example concrete extension type definition in accordance with an illustrative embodiment. Definition 402 can be implemented as concrete extended type definition 324 in FIG. 3.

In one example embodiment, definition 402 allows expanding an answer key, such as to form a part of answer key 300 in FIG. 3, by including a numeric range of numbers as extended acceptable answers. Any number within the range specified by minimum threshold 404, maximum threshold 406, with the inclusion or exclusion of the thresholds indicated by "range inclusive" Boolean attribute 408.

Figure 5:
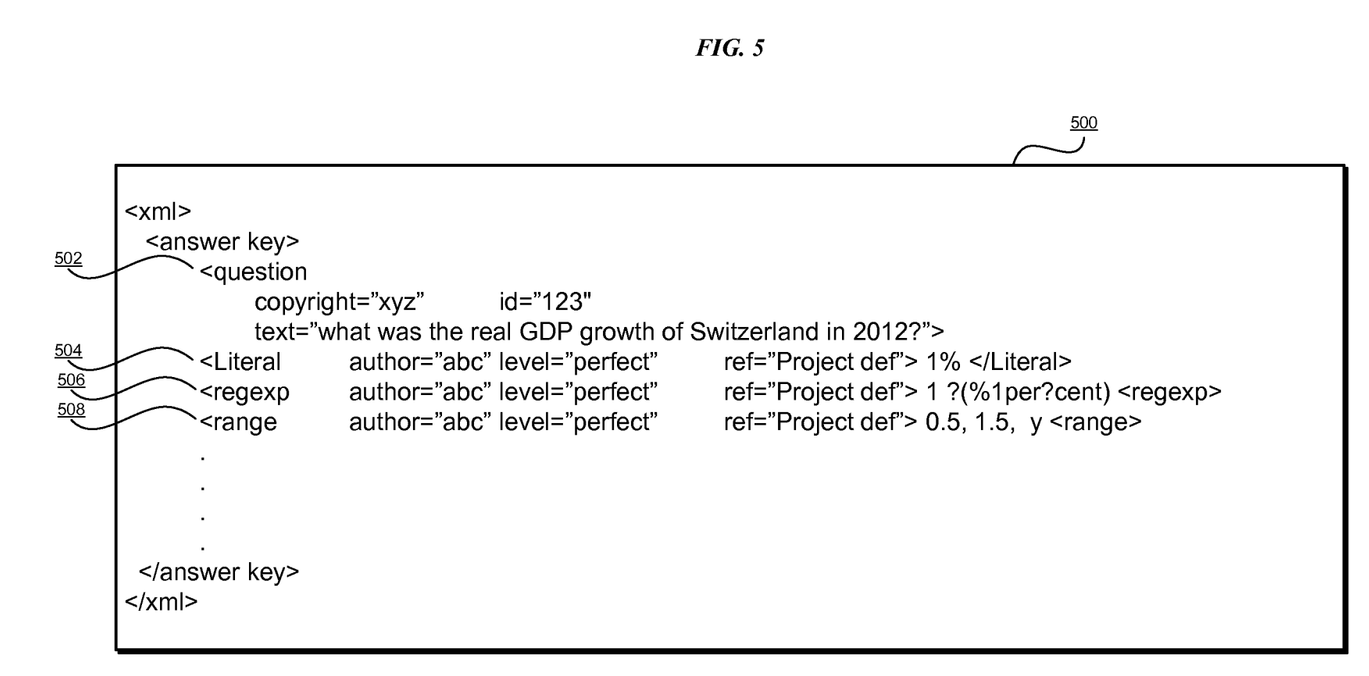
FIG. 5 depicts an example expanded answer key in accordance with an illustrative embodiment.

With reference to FIG. 5, this figure depicts an example expanded answer key in accordance with an illustrative embodiment. Answer key 500 can be implemented as answer key 300 in FIG. 3.

Answer key 500 is constructed according to XML specification only as an example. In the depicted example, answer key 500 includes question type object 502. Question type object 502 includes several answer type objects, to wit, answer type objects 504, 506, and 508, each of which provide a manner of computing an acceptability of an answer provided by a Q and A system.

Answer type object 504 is a literal type object and verifies an answer as correct only if the answer is exactly the string "1%". Answer type object 506 is a regular expression type object and verifies an answer as correct only if the answer is one of strings "1%", "1%", "1%", "1 percent", "1percent", "1 percent", "1 percent", and certain other spacing variations.

Answer type object 508 is a number range type object and verifies an answer as correct if the answer is anywhere between 05 and 1.5, inclusive of the numbers 0.5 and 1.5. For example, where an answer of "0.9" would not be a valid answer according to prior art answer type objects 504 and 506, extended answer type object 508 allows a correct answer to be represented as "0.9" and other numbers in the range 05-1.5, inclusive.

Answer key 500 can include any number of question type objects to represent any number of questions for a domain in a similar manner. Answer key 500 can include any number of prior art answer type objects, any number or types of extended answer type objects, or a combination thereof, for a question represented in answer key 500.

Figure 6:
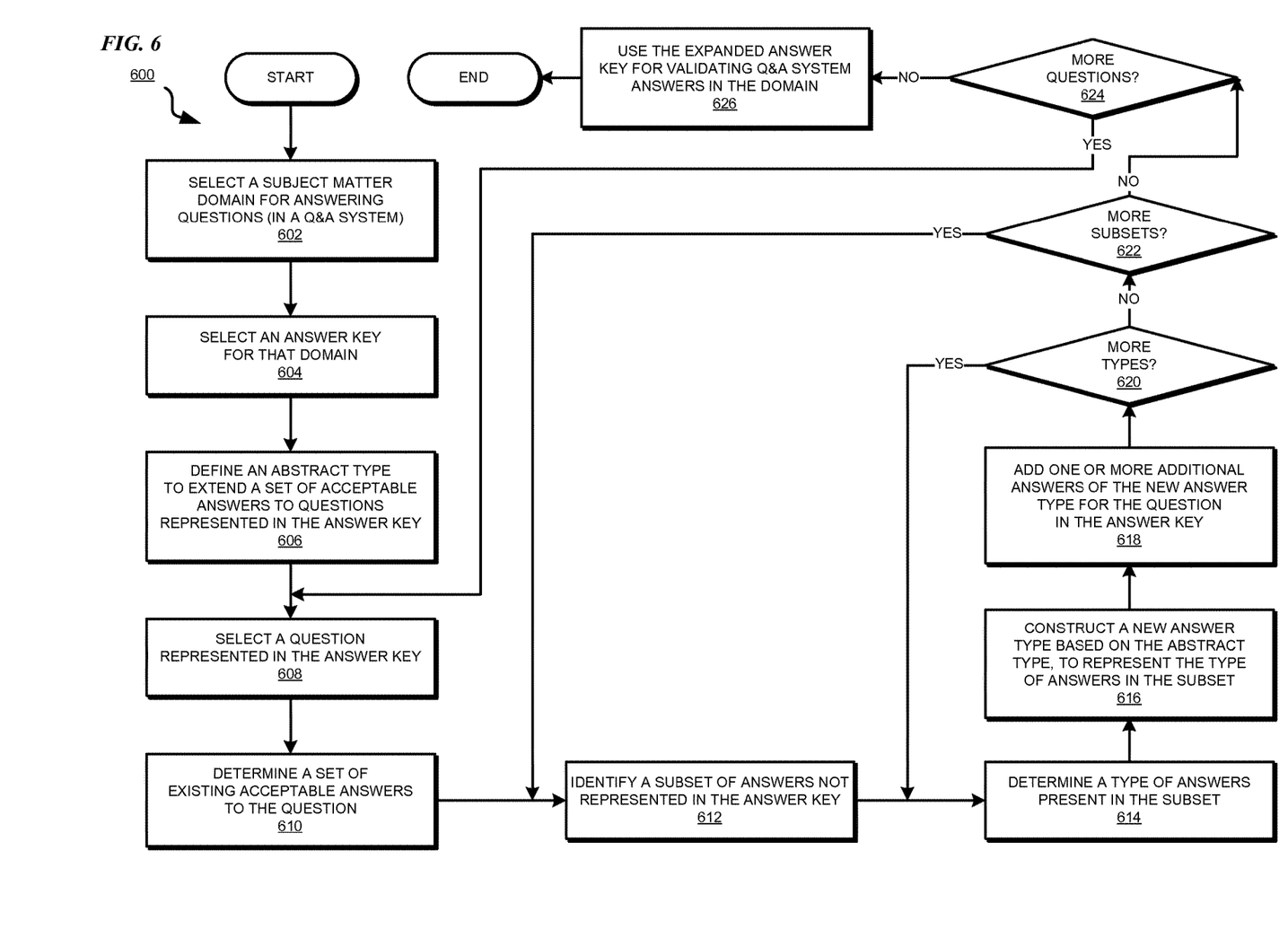
FIG. 6 depicts a flowchart of an example process of expanding an answer key to verify a question and answer system in accordance with an illustrative embodiment.

With reference to FIG. 6, this figure depicts a flowchart of an example process of expanding an answer key to verify a question and answer system in accordance with an illustrative embodiment. Process 600 can be implemented in application 109 in FIG. 1 to create extended answer key 500 in FIG. 5.

Optionally, the application selects a subject matter domain for using with a Q and A system to answer questions pertaining to that domain (block 602). The application selects an answer key repository for the domain (block 604). The application defines an abstract extension answer type to extend a set of acceptable answers to the questions represented in the answer key (block 606).

The application selects a question represented in the answer key (block 608). The application determines a set of existing acceptable answers to the question, regardless of their representation in the answer key (block 610).

The application identifies a subset of the answer determined in block 708, where the subset is not represented in the answer key (block 612). The application determines a type associated with the answers present in the subset (block 714).

The application constructs a new answer type based on the abstract type of block 606, to represent the type determined in block 614 (block 616). For example, the application constructs extended answer types 314 and 316 in FIG. 3 by constructing concrete extension type objects 324 and 326 in FIG. 3. Note that more than one new answer types may be created in block 616 in this manner to adequately represent a type of answer found in block 614. The application adds one or more additional answers of the new answer type(s) for the question in the answer key (block 618).

The application determines whether answers of additional types are present in the subset (block 620). If additional types are present ("Yes" path of block 620), the application returns to block 614 to determine another type.

If no more types are present in the subset of answers ("No" path of block 620), the application determines whether more subsets of unrepresented answers exist in the set of answers (block 622). If more subsets exist ("Yes" path of block 622), the application returns to block 612 to select another subset of unrepresented answers.

If no more subsets of unrepresented answers remain ("No" path of block 622), the application determines whether more questions are represented in the answer key (block 624). If more questions are represented ("Yes" path of block 624), the application returns to block 608 to select another question.

If no more questions remain ("No" path of block 624), the application uses, or makes available for use, the extended answer key for validating the Q and A system's answers in the domain (block 626). The application ends process 600 thereafter.

In one embodiment, the validation of an extended answer key is performed using the extended answer type characteristics and metadata. For example, an extended answer type may be denoted as "angry" with metadata to include synonyms. The presence of metadata, an answer key type, or a combination thereof, would include synonyms for the word "angry".

Thus, in an embodiment, the types of the extended and abstract answer keys can be further accompanied by specific computational logic, such as inclusion or exclusion of ontologies and other resources via metadata, to determine the validity of an answer.

Figure 7:
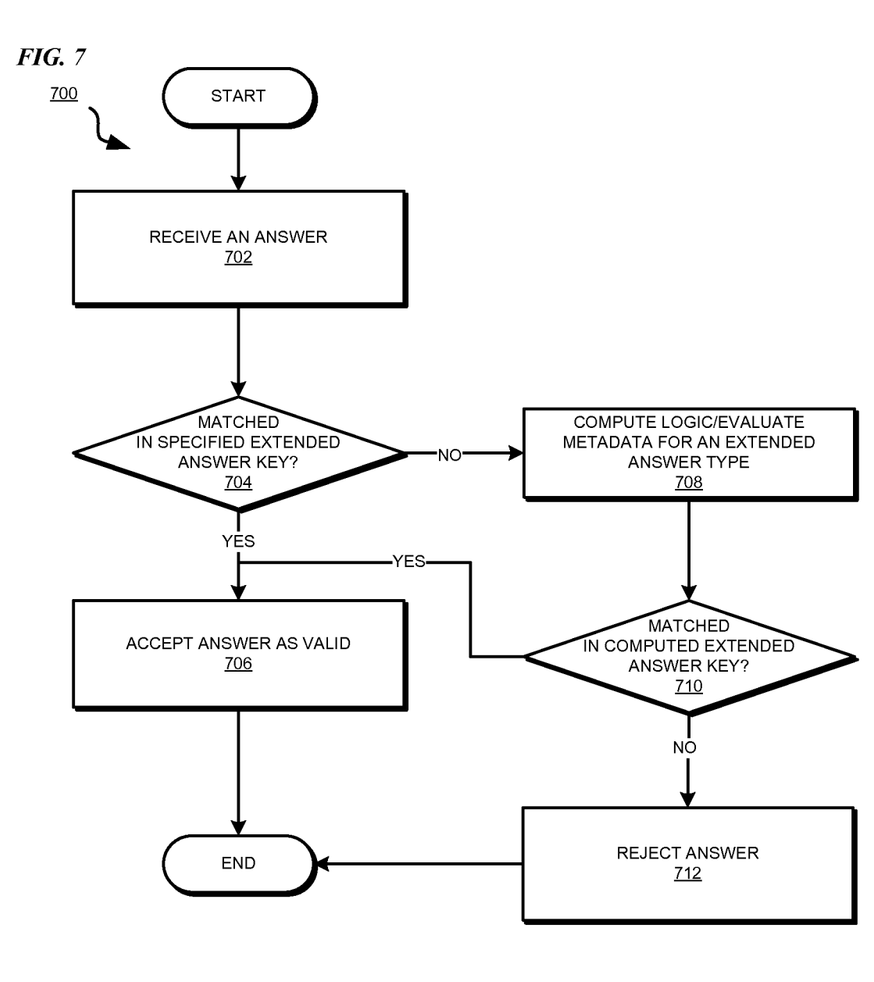
FIG. 7 depicts a flowchart of validating a Q and A system answer using an expanded answer key in accordance with an illustrative embodiment.

With reference to FIG. 7, this figure depicts a flowchart of validating a Q and A system answer using an expanded answer key in accordance with an illustrative embodiment. Process 700 can be used by an answer validation application to validate Q and A system 105 in FIG. 1 using answer key 500 in FIG. 5. In one embodiment, application 109 in FIG. 1 can include answer validation functionality.

An application, such as application 109 in FIG. 1 including answer validation functionality, receives an answer from a Q and A system (block 702). The application determines whether the answer matches an answer specified in the expanded answer key (block 704). If the answer matches a specified answer ("Yes" path of block 704), the application accepts the answer as a valid answer (block 706). The application ends process 700 thereafter.

If the answer does not match a specified answer ("No" path of block 704), the application computes logic specified for an extended answer type, or evaluates metadata of the answer key to determine additional valid answers of the extended answer type (block 708). The application determines whether the answer of the Q and A system matches a computed answer according to the expanded answer key (block 710). For example, the logic of an extended answer type may cause the answer key to include a library of synonyms, and the answer of the Q and A system may match a synonym of a word in such a library.

If the answer matches a computed answer ("Yes" path of block 710), the application returns to block 706. If the answer does not match a computed answer ("No" path of block 710), the application rejects the answer of the Q and A system (block 712). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for expanding an answer key to verify a question and answer system. An embodiment extends an answer key used for verifying the correctness of the answers provided by a Q and A system. The extensions are flexible as to the types of answers that can be used to extend the answer key. Some extensions are also dynamic, to accommodate the dynamic nature of certain answers or answer types. The extended answer key is usable in an existing manner with existing Q and A systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for expanding an answer key to verify a question and answer (Q and A) system, the method comprising:

executing an answer verification application in conjunction with an artificial intelligence (AI) application, the AI application executing as a part of the Q and A system in a data processing system, the AI application configured to compute a natural language (NL) answer in response to an NL question input into the Q and A system by (i) parsing the NL question into a major feature, (ii) constructing a query from the major feature, (iii) applying the query to a corpus to select a portion of the corpus that is responsive to the NL question, (iv) executing a reasoning algorithm to perform a deep analysis of a language of the NL question and a language of the portion of the corpus, the deep analysis returning a score, the score being indicative of an extent to which a potential response is inferred by the NL question, (v) weighting the score against a statistical model to determine that the potential response is strongest in a set of potential responses, and (vi) outputting the potential response as a generated answer from the Q and A system, wherein the executing the answer verification application evaluates an accuracy of the Q and A system, the executing the answer verification application comprising:

constructing, a definition of an extended answer type, wherein the extended answer type represents an answer type of an unrepresented answer, wherein the unrepresented answer is unrepresented in the answer key as a valid response to the NL question in a set of valid responses to the NL question in the answer key;

creating the extended answer type in the answer key according to the definition;

populating the extended answer type such that the unrepresented answer becomes as additional valid response to the question, the creating and the populating extending the answer key to form an extended answer key; and using the populated extended answer type in the extended answer key to verify that the generated answer from the Q and A system is correct.

2. The method of claim 1, wherein the generated answer is incorrect according to an existing answer type in the answer key.

3. The method of claim 1, further comprising:

forming the definition by modifying an abstract definition;

constructing a second definition of a second extended answer type, wherein the second extended answer type represents an answer type of a second unrepresented answer.

4. The method of claim 3, wherein the abstract definition is used as a placeholder in the extended answer key for a third extended answer type.

5. The method of claim 1, wherein the unrepresented answer becomes the additional valid answer because a computation using the populated extended answer type results in the additional valid response.

6. The method of claim 1, wherein the unrepresented answer becomes the additional valid answer because a logic described in a metadata of the extended answer key computes to make the unrepresented answer the additional valid response.

7. The method of claim 1, wherein the unrepresented answer becomes the additional valid answer by being a member of a range of values specified in the populated extended answer type.

8. The method of claim 1, wherein the unrepresented answer becomes the additional valid answer by being a member of a range of values, wherein the range of values is computed using logic in a metadata of the extended answer key.

9. The method of claim 1, further comprising:
configuring the extended answer type with a changeable condition, wherein a value of the additional valid answer changes when the condition changes.

10. The method of claim 1, wherein the extended answer key in an Extensible Markup Language (XML) document, wherein the definition is an XML structure.

11. The method of claim 1, wherein the question comprise a sentence in natural language, wherein the Q and A system is configured to respond to the natural language question.

12. The method of claim 1, wherein the question comprise a sentence in natural language, wherein the Q and A system is configured to respond to the natural language question using another extended answer type to represent answers one of (i) based on a cultural reference, (ii) in a particular language, and (iii) from a set of synonyms.

* * * * *